US008826305B2

(12) United States Patent
Filali-Adib et al.

(10) Patent No.: US 8,826,305 B2
(45) Date of Patent: Sep. 2, 2014

(54) SHARED VERSIONED WORKLOAD PARTITIONS

(75) Inventors: Khalid Filali-Adib, Austin, TX (US); John M. McConaughy, Austin, TX (US); David W. Sheffield, Austin, TX (US); Marc J. Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/449,963

(22) Filed: Apr. 18, 2012

(65) Prior Publication Data

US 2013/0283297 A1    Oct. 24, 2013

(51) Int. Cl.
*G06F 3/00* (2006.01)
*G06F 9/455* (2006.01)

(52) U.S. Cl.
USPC ............................................. 719/319; 718/1

(58) Field of Classification Search
None
See application file for complete search history.

(56) References Cited

U.S. PATENT DOCUMENTS

| 2002/0032850 | A1* | 3/2002 | Kauffman | 712/31 |
|---|---|---|---|---|
| 2007/0050764 | A1* | 3/2007 | Traut | 718/1 |
| 2008/0271017 | A1 | 10/2008 | Herington | |
| 2010/0083283 | A1* | 4/2010 | Kharat et al. | 719/319 |
| 2010/0185823 | A1 | 7/2010 | De et al. | |
| 2011/0010709 | A1 | 1/2011 | Anand et al. | |
| 2011/0258636 | A1 | 10/2011 | Chopra et al. | |
| 2012/0011501 | A1* | 1/2012 | Filali-Adib et al. | 718/1 |
| 2012/0011513 | A1 | 1/2012 | McConaughy et al. | |
| 2012/0066333 | A1* | 3/2012 | Browning et al. | 709/212 |
| 2013/0174144 | A1* | 7/2013 | Cheng et al. | 718/1 |

OTHER PUBLICATIONS

"Introduction to Workload Partition Management in IBM AIX Version 6.1", IBM, 2007, pp. 1-298.*
"Finding Reprsentative Workloads for Computer System Design", Bonebakker, 2007, pp. 1-250.*
Bartels, Christian et al.; SAP Applications on IBM PowerVM; IBM Redbook; Oct. 2011; pp. 1-194.

* cited by examiner

*Primary Examiner* — Tuan Dao
(74) *Attorney, Agent, or Firm* — James L. Baudino

(57) ABSTRACT

According to one aspect of the present disclosure a system and technique for shared versioned workload partitions is disclosed. The system includes a processor and logic executable by the processor to: create, in a host machine running an instance of a first version of an operating system, a first workload partition associated with a second version of the operating system, the second version of the operating system comprising a different version of the operating system than the first version of the operating system; create, in the logical partition, a second workload partition associated with the second version of the operating system; and hierarchically link the second workload partition to the first workload partition to enable sharing of resources of the first workload partition by the second workload partition.

11 Claims, 5 Drawing Sheets

SHARED VERSIONED WORKLOAD PARTITIONS

BACKGROUND

Operating system virtualization is a technology which can divide a single host (e.g., computer, server, etc.), into multiple parts, or partitions, each running a separate instance, or image, of an operating system. The instances of the operating systems are separate, or isolated, from each other in some ways. For example, the instances of the operating systems have separate file systems, separate users, separate applications, and separate processes. However, the instances of the operating systems may also share some resources of the host. For example, the instances of the operating systems can share the memory, the kernel, the processors, the hard drives, and/or other software, firmware, and/or hardware of the host. Thus, each instance of the operating system can look and feel like a separate server or machine from the perspective of its users. These instances of the operating system are commonly referred to as "virtual" or "virtualized" operating systems.

A software workload partition (WPAR) provides isolation of software services, applications, and administration utilizing software-defined boundaries within an instance of an operating system. For example, a WPAR is a software implementation of operating system virtualization. More specifically, a WPAR is a software partition that is created from, runs under, and shares the resources of a managing instance of a base operations system. Typically, the WPARs and the managing instance share an identical operating system (e.g., identical version, etc.). However, in some instances, a WPAR may be associated with a legacy operating system (i.e., an earlier version of the base operating system).

BRIEF SUMMARY

According to one aspect of the present disclosure a system and technique for shared versioned workload partitions is disclosed. The system includes a processor and logic executable by the processor to: create, in a host machine running an instance of a first version of an operating system, a first workload partition associated with a second version of the operating system, the second version of the operating system comprising a different version of the operating system than the first version of the operating system; create, in the logical partition, a second workload partition associated with the second version of the operating system; and hierarchically link the second workload partition to the first workload partition to enable sharing of resources of the first workload partition by the second workload partition.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
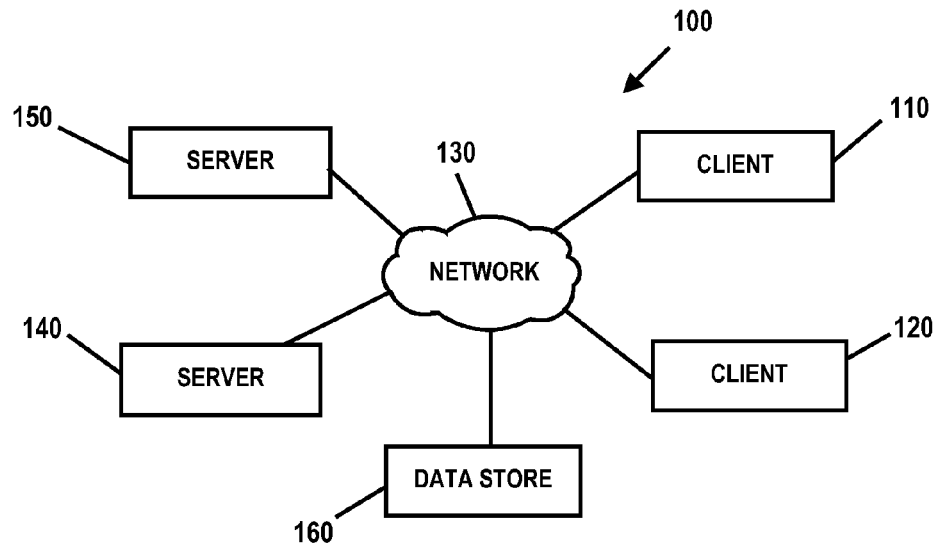
FIG. 1 is an embodiment of a network of data processing systems in which the illustrative embodiments of the present disclosure may be implemented.

Embodiments of the present disclosure provide a method, system and computer program product for shared versioned workload partitions. For example, in some embodiments, the method and technique includes: creating, in a host machine running an instance of a first version of an operating system, a first workload partition associated with a second version of the operating system, the second version of the operating system comprising a different version of the operating system than the first version of the operating system; creating, in the logical partition, a second workload partition associated with the second version of the operating system; and hierarchically linking the second workload partition to the first workload partition to enable sharing of resources of the first workload partition by the second workload partition. Thus, in some embodiments of the present disclosure, a versioned workload partition associated with a legacy or earlier operating system version is designated as a "parent" versioned workload partition. One or more additional versioned workload partitions associated with the same legacy operating system version may be created and hierarchically linked as child/dependent workload partitions to the parent workload partition. The child/dependent versioned workload partitions share certain resources of the parent workload partition, thereby utilizing less disk/memory space and enabling efficient synchronization of multiple versioned workload partitions associated with the same legacy operating system version.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
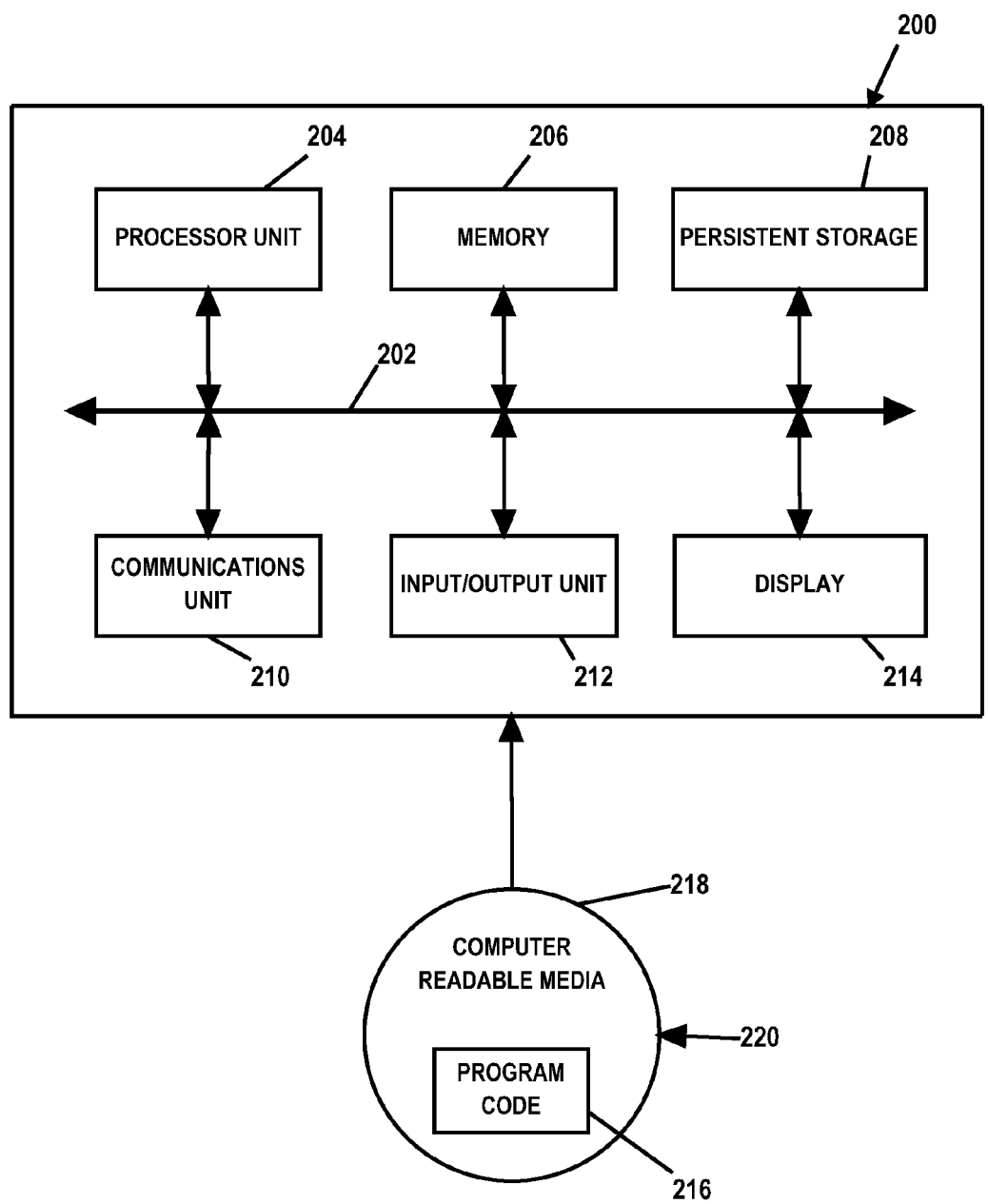
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a shared versioned workload partition according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
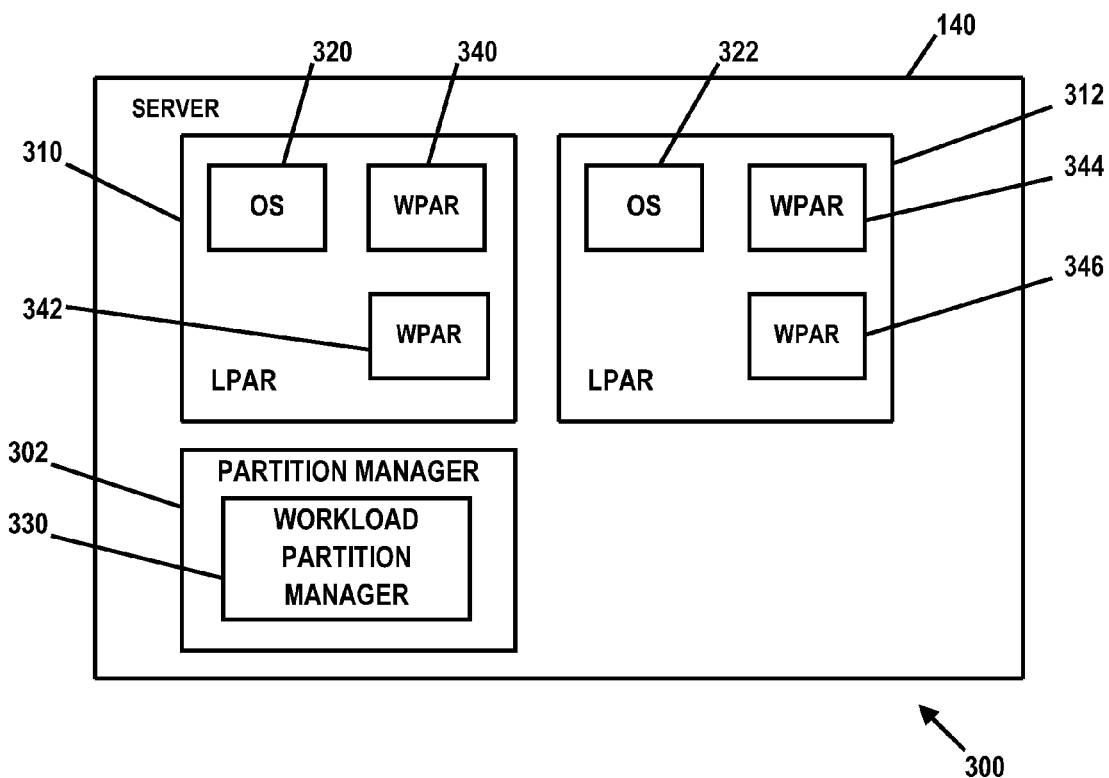
FIG. 3 is a diagram illustrating an embodiment of a data processing system for managing logical partitions and workload partitions in which illustrative embodiments of the present disclosure may be implemented.

FIG. 3 is an illustrative embodiment of a system 300 for shared versioned workload partitions. System 300 may be implemented on data processing systems or platforms such as, but not limited to, servers 140 and/or 150, clients 110 and/or 120, or at other data processing system locations. For example, in the embodiment illustrated in FIG. 3, an embodiment of system 300 is implemented on server 140. It should be understood that embodiments of the present disclosure may be implemented elsewhere such as, but not limited to, client 110 and/or server 150. Server 140 is configured to implement software such as processes, applications, operating systems, etc. In FIG. 3, server 140 includes a partition manager 302. Partition manager 302 may be executing in server 140 and may create one or more logical partitions ("LPARs") 310 and 312 within the server 140 environment. LPARs are assigned a subset of a computer's hardware resources (i.e., a subset of the hardware underlying the server environment) and are virtualized within the server environment as a separate computer. Resources such as processor capacity, memory, or any other type of resource may be assigned to a particular LPAR. Each LPAR has its own virtual operating system (OS) instance (e.g., operating systems 320 and 322 in respective LPARs 310 and 312) and associated files, allowing for multiple operating systems to be simultaneously executing within the server 140 environment.

In FIG. 3, partition manager 302 includes a workload partition manager 330. Workload partition manager 330 may create and manage one or more workload partitions ("WPARs") to be executing within a logical partition. WPARs are virtual operating system instances which may independently behave like an operating system image. Workload partition manager 330 may be wholly or partially a component of partition manager 302 (as depicted in FIG. 3) or may be an entirely separate module. In FIG. 3, LPAR 310 includes WPARs 340 and 342, and LPAR 312 includes WPARS 344 and 346; however, it should be understood that the quantity of WPARS created in any one of LPARs may vary. Partition manager 302 and/or workload partition manager 330 may be implemented in any suitable manner using known techniques that may be hardware-based, software-based, or some combination of both. For example, partition manager 302 and/or workload partition manager 330 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Operating system virtualization or WPARs may be used to organize and isolate workloads in accordance with business requirements, organizational guidelines, etc., while utilizing available equipment. For instance, an administrator can create different WPARs for a marketing department database and associated applications ("marketing database workload"), an accounting department database and associated applications ("accounting database workload"), and legal department electronic mail server ("legal e-mail workload"). Instead of using three different servers, the resources of a single server can be used to satisfy the needs of the three workloads. Each WPAR presents to the respective hosted workload (i.e., processes, application(s) of the workload) as an instance of an operating system with its own namespace and process environment. Typically, WPARs are associated with the same version of the main or base operating system that is executed in the system (e.g., within a single host computer system, or within a single LPAR). In other words, the operating system environment of the WPAR is limited to the version of the base operating system of the underlying kernel and device driver software of the system. WPARs associated with the same version of the global or base operating system can be referred to as "native WPARs." In some instances, WPARs can be associated with an earlier version or legacy version of the base operating system and can be referred to as "versioned WPARs."

Figure 4:
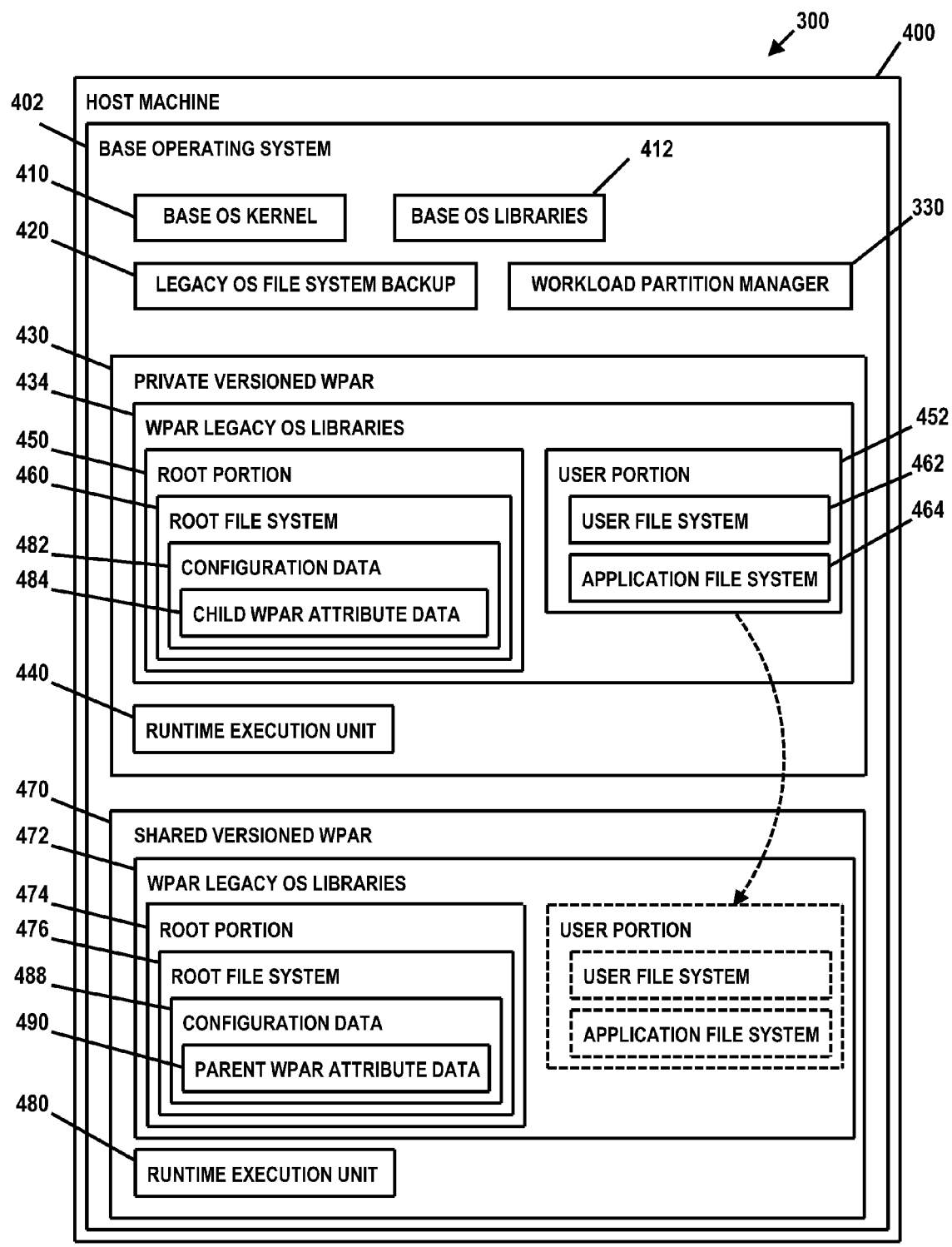
FIG. 4 is a diagram illustrating a system for shared versioned workload partitions in which illustrative embodiments of the present disclosure may be implemented.

FIG. 4 is a diagram illustrating an embodiment of system 300 having versioned WPARs on a data processing system or machine 400 running a different version of the global or base operating system. In the embodiment illustrated in FIG. 4, machine 400 is running a global or base operating system 402. Machine 400 may be a single host computer system, or a single LPAR within a host computer system with a plurality of LPARs. The global or base operating system (OS) 402 comprises a kernel 410, workload partition manager 330, base OS libraries 412, and a legacy OS file system backup 420. Legacy OS file system backup 420 is a file that includes a backup of legacy file systems of the legacy OS, which is an earlier version of base OS 402. Workload partition manager 330 may be used to create and manage WPARs within base OS 402. In some embodiments, workload partition manager 330 can create WPARs associated with base OS 402 and "versioned" WPARs associated with an earlier or different version of base OS 402 (e.g., the legacy OS). For example, workload partition manager 330 can create a versioned WPAR 430, associated with the legacy OS, on the system executing the base OS 402. In some embodiment, each WPAR comprises all the user level code, including commands and libraries, that interact with the kernel level code (i.e., kernel 410 of base OS 402), which is common to all the WPARs that are created on top of base OS 402. For example, WPAR 430 can include legacy OS libraries 434. WPAR 430 can also include a runtime execution unit 440 for establishing the execution path for commands, and executing the commands for processes that are running within the WPAR.

In some embodiments, workload partition manager 330 creates WPAR 430, associated with the legacy OS (i.e., an earlier version of base OS 402) by first creating a set of file systems and then populating the set of file systems with the content of legacy OS file system backup 420. For example, workload partition manager 330 can create the virtualized runtime environment of WPAR 430 by populating the file systems with the legacy OS libraries 434 (which are stored in the legacy OS file system backup 420). In the illustrated embodiment, legacy OS libraries 434 include a root portion 450 and a user portion 452; however, it should be understood that legacy OS libraries 434 may include additional and/or different file systems, directories, libraries and/or resources. Root portion 450 may comprise configuration information, management and/or privileged commands, files and directories for system operation, file system mounting information, etc. For example, in the illustrated embodiment, root portion 450 includes a root file system 460. However, it should be understood that root portion 450 may include additional and/or different root components and/or resources. User portion 450 may include software/applications and/or data that is common to and/or shared resources among machines and/or users. For example, in the illustrated embodiment, user portion 452 includes a user file system 462 and an application file system 464. User file system 462 may comprise files and/or data that can be shared by machines (e.g., by machines of the same hardware architecture). Application file system 464 may comprise optional and/or user-specified software (e.g., third party applications). However, it should be understood that user portion 452 may include additional and/or different file systems, directories, libraries and/or resources. In the illustrated embodiments, versioned WPAR 430 may be referred to as a "private" versioned WPAR having its own writeable copies of the legacy OS libraries 434. For example, as a private versioned WPAR, WPAR 430 has its own writeable copies of root file system 460, a user file system 462 and an application file system 464.

In the embodiment illustrated in FIG. 4, machine 400 also includes a "shared" versioned WPAR 470. In some embodiments, workload partition manager 330 creates WPAR 470, also associated with the legacy OS (i.e., an earlier version of base OS 402), by first creating a set of file systems and then populating the set of file systems with the content of legacy OS file system backup 420. For example, workload partition manager 330 can create the virtualized runtime environment of WPAR 470 by populating the file systems with legacy OS libraries 472 (which are stored in the legacy OS file system backup 420). For example, legacy OS libraries 472 include a root portion 474 having a root file system 476. As described above, root portion 474 may comprise configuration information, management and/or privileged commands, files and directories for system operation, file system mounting information, etc. In the illustrated embodiment, WPAR 470 is associated with a same version of the legacy OS as WPAR 430. WPAR 470 can also include a runtime execution unit 480 for establishing the execution path for commands, and executing the commands for processes that are running within the WPAR.

According to the present disclosure, workload partition manager 330 uses WPAR 430 as a source of certain resources to be shared by other WPARs of the same legacy version OS. For example, in some embodiments, the private versioned WPAR, with its own private writeable copy of certain file systems containing appropriate levels of commands and libraries, may provide those file systems to other versioned WPARs of the same legacy OS to share. For example, in response to a request to create new versioned WPAR 470, workload partition manager 330 may be used to determine whether another versioned WPAR associated with the same version of the legacy OS as that for WPAR 470 already exists on machine 400. If so (e.g., WPAR 430), workload partition manager 330 may specify WPAR 430 as a "parent" WPAR and any WPAR that shares resources provided by WPAR 430 (e.g., file systems) as a "child" WPAR of WPAR 430. Thus, workload partition manager 330 hierarchically links versioned WPARs for a particular legacy OS version that are sharing resources. Accordingly, in this example, WPAR 430 would be identified as a parent WPAR of WPAR 470, and WPAR 470 would be identified as a child WPAR of WPAR 430. In some embodiments, workload partition manager 330 updates configuration information for each hierarchically linked versioned WPAR to include an attribute identifying the linking relationships of respective WPARs. For example, in the illustrated embodiment, root file system 460 of WPAR 430 may include configuration data 482. As a "parent" versioned WPAR, configuration data 482 of WPAR 430 may include child attribute data 484 identifying versioned WPARs that are "children" WPARs sharing resources of WPAR 430 (e.g., WPAR 470). Similarly, in the illustrated embodiment, root file system 476 may include configuration data 488. As a "child" versioned WPAR, configuration data 488 may include parent attribute data 490 identifying the versioned WPAR that is the parent versioned WPAR from which certain resources are being shared (e.g., WPAR 430). In the embodiment illustrated in FIG. 4, a single "child" versioned WPAR is illustrated (e.g., WPAR 470); however, it should be understood that multiple child WPARs may be created and hierarchically linked to a parent versioned WPAR. It should also be understood that a "family" of versioned WPARs (e.g., a parent versioned WPAR and its linked children version WPARs) may be created for each version of a legacy OS. In the above description, the versioned WPARs are described in connection with a "legacy" or earlier version of an OS; however, it should be understood that the present disclosure may be applied to any version of a particular OS that is different than a version of the base OS.

Thus, according to the present disclosure, the child WPAR 470 would have its own writeable copy of root file system 476 but shares certain file systems from WPAR 430 (e.g., user file system 462 and/or application file system 464), thereby enabling the child/dependent WPARs to use the operating system libraries and commands from the shared file systems of the parent WPAR. Accordingly, WPAR 470 would mount user file system 462 and/or application file system 464 from WPAR 430. Typically, a file system of a particular WPAR may be mounted only when the WPAR is active. According to the present disclosure, the parent WPARs file systems would remain mounted as long as either the parent WPAR or any of its dependent WPARs (i.e., child WPARs of the parent WPAR) are active. Thus, even if the parent WPAR is placed in an inactive state (e.g., not running or executing anything), its file system would remain mounted if there exists a corresponding child WPAR of the parent WPAR to enable the child WPAR to mount the shared file systems. In some embodiments, child attribute data 484 may be used by workload partition manager 330 to determine whether there exists a child WPAR to ensure that a file system of the parent WPAR remains mounted. However, it should be understood that other methods and/or information may be used by workload partition manager 330 to ensure that a file system of a parent WPAR remains mounted to enable sharing of file systems by a child WPAR.

In some embodiments, a synchronization mechanism may be used to manage maintenance or other actions corresponding to a related family of versioned WPARs. For example, in some embodiments, workload partition manager 330 may be used to enable synchronization of software between a parent WPAR and its respective child WPARs. In some embodiments, for example, a software package (e.g., new software, updated software, etc.) may be installed in the parent WPAR (e.g., WPAR 430). Workload partition manager 330 may be used to initiate and/or execute a synchronization command to automatically install a root portion of the software package into respective root portions of respective child WPARs of the parent WPAR (e.g., WPAR 470). Thus, in embodiments having many shared versioned WPARs, the synchronization mechanism may be used to effectively manage software installation to ensure the parent and child WPARs are running the same level or configuration of software.

Workload partition manager 330 may also be used to monitor and/or track changes of a family of linked versioned WPARs, update configuration data as applicable (e.g., child attribute data 484 and parent attribute data 490) and/or manage the creation/deletion of versioned WPARs. For example, in some embodiments, in response to a deletion of a child versioned WPAR (e.g., WPAR 470), workload partition manager 330 may automatically update child attribute data 484 of the parent WPAR (e.g., WPAR 430) to remove the attribute identifying the deleted child WPAR. Further, if a parent WPAR was to be deleted, each child WPAR would be deleted before deletion of the parent WPAR. Further, in some embodiments, if a child WPAR is to be moved from one system/machine to another, the receiving system/machine would determine whether a parent WPAR of the same version legacy OS exists. If not, a parent versioned WPAR with a version of a legacy OS of that of the moved WPAR would first be created, and then the moved WPAR designated as a child of the newly created parent WPAR. Alternatively, the moved versioned WPAR may be configured as the parent WPAR and thereafter additional versioned WPARs having the same legacy OS version may be designated as child WPARs. After moving of the WPAR to another machine/system, the configuration data of the prior parent WPAR (e.g., child attribute data 484) is updated to reflect removal the of the moved WPAR as a child WPAR of the prior parent WPAR.

Figure 5:
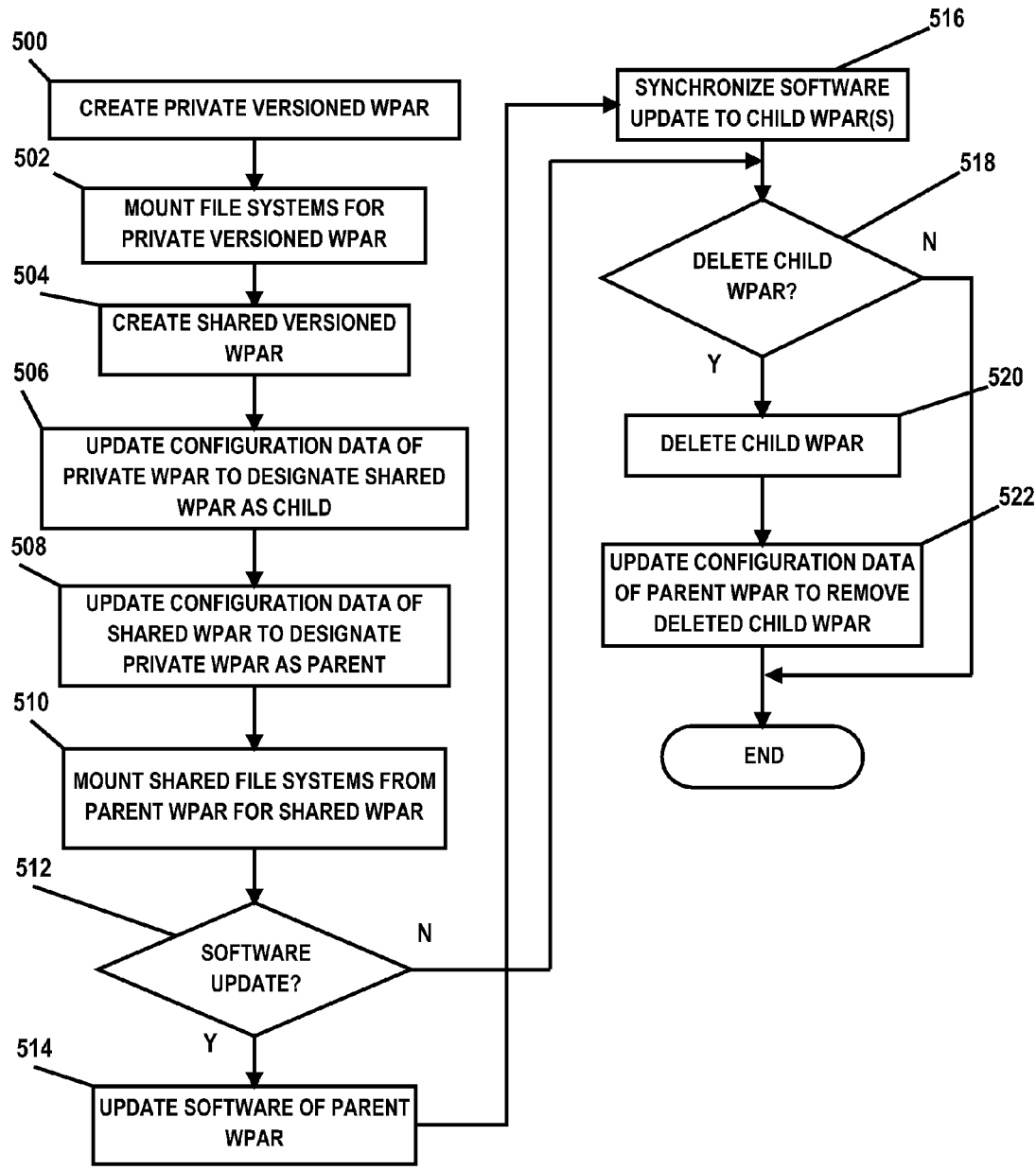
FIG. 5 is a flow diagram illustrating an embodiment of a method for managing shared versioned workload partitions.

FIG. 5 is a flow diagram illustrating an embodiment of a method for managing versioned WPARs on a data processing system or machine running a different version of the global or base operating system. The method begins at block 502, where workload partition manager 330 is used to create a private versioned WPAR (e.g., WPAR 430). At block 502, file systems for the private versioned WPAR are mounted. At block 504, workload partition manager 330 creates a shared versioned WPAR (e.g., WPAR 470) associated with a same legacy OS version as the created private versioned WPAR. In some embodiments, workload partition manager 330 may determine the legacy OS version of the shared versioned WPAR to be created and determine whether a private versioned WPAR with the same legacy OS version already exists on the host machine. If not, the shared versioned WPAR to be created may instead be created as a parent private versioned WPAR for later-created shared versioned WPARs of the same legacy OS version. Alternatively, a private versioned WPAR may be created (e.g., as performed at block 500) to provide a parent private versioned WPAR for the new shared versioned WPAR.

At block 506, configuration data of the private versioned WPAR (e.g., child attribute data 484) is updated to identify the newly created shared versioned WPAR as a child or dependent WPAR of the private versioned WPAR. At block 508, configuration data of the shared versioned WPAR (e.g., parent attribute data 490) is updated to identify the private versioned WPAR as the parent WPAR of the shared versioned WPAR. At block 510, file systems from the private versioned WPAR (e.g., user file system 462 and/or application file system 464) are mounted for the shared versioned WPAR. At decisional block 512, a determination is made whether a software update is to be installed for the particular legacy OS version. If so, the method proceeds to block 514, where a software package (e.g., new software, updated software, etc.) may be installed in the parent private versioned WPAR (e.g., WPAR 430). At block 516, workload partition manager 330 may be used to initiate and/or execute a synchronization command to automatically install a root portion of the software package into a respective root portion of the child shared versioned WPAR of the parent WPAR (e.g., WPAR 470). If at block 512 it is determined that a software update is not needed, the method proceeds to decisional block 518.

At decisional block 518, a determination is made whether a child shared versioned WPAR (e.g., WPAR 470) is to be deleted from the host machine. If not, the method ends. If so, the method proceeds to block 520, where workload partition manager 330 may be used to delete the child shared versioned WPAR from the host machine. At block 522, configuration data of the private versioned WPAR (e.g., child attribute data 484) is updated to delete or remove the deleted shared versioned WPAR as a child or dependent WPAR of the private versioned WPAR.

Figure 6:
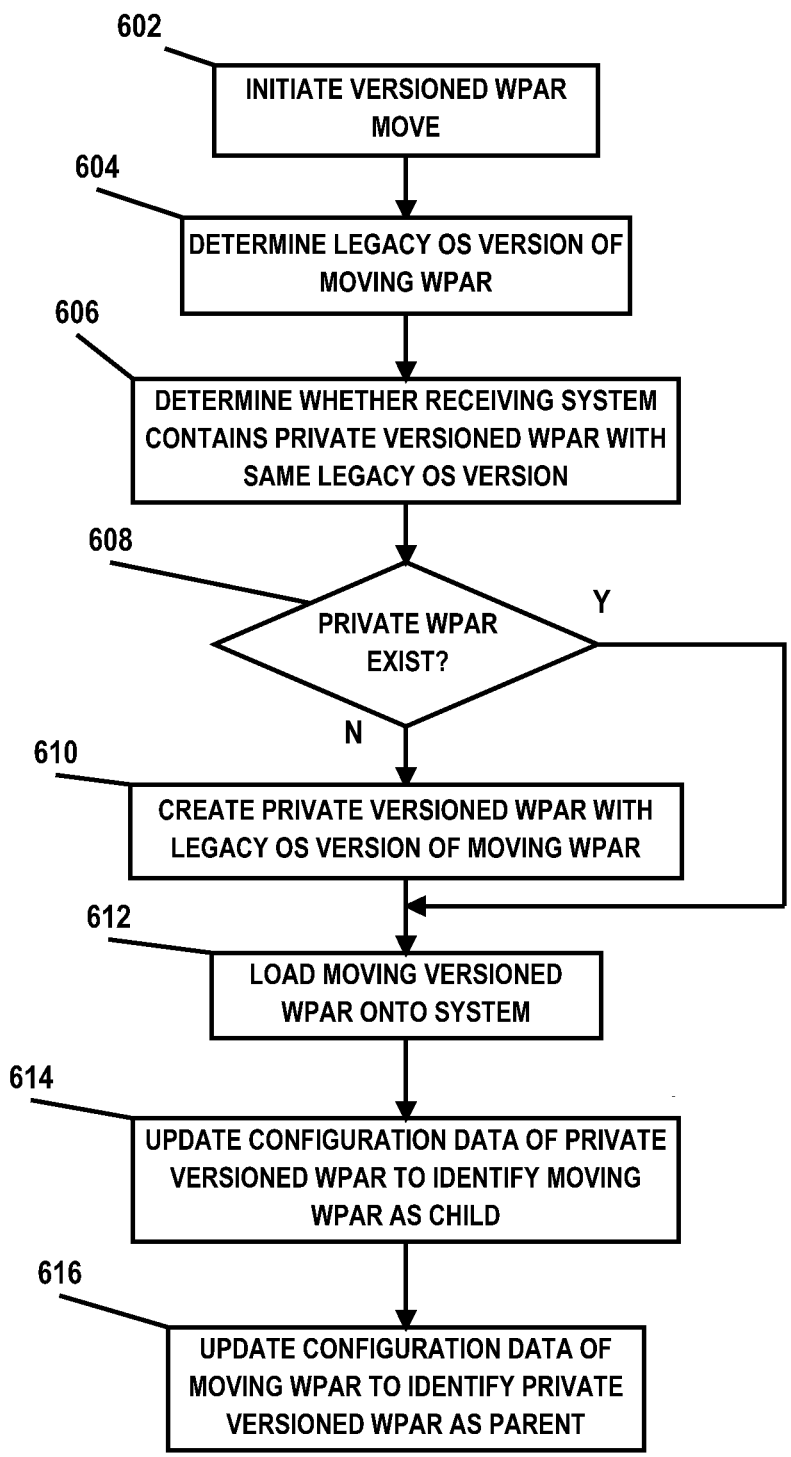
FIG. 6 is a flow diagram illustrating another embodiment of a method for managing shared versioned workload partitions.

FIG. 6 is a flow diagram illustrating another embodiment of a method for managing versioned WPARs on a data processing system or machine running a different version of the global or base operating system. The method begins at block 602, where a versioned WPAR is to be moved from one machine/host system (or LPAR) to another machine/host system (or LPAR). At block 604, workload partition manager 330 may be used to determine the legacy OS version of the versioned WPAR to be moved. At block 606, workload partition manager 330 may be used to determine whether the host machine/system to receive the moving WPAR contains a private versioned WPAR of the same legacy OS version as the moving WPAR (e.g., to determine whether there resides on the receiving host machine/system a private versioned WPAR that may be a parent WPAR for the moving WPAR). At decisional block 608, a determination is made whether the receiving host machine/system contains a private versioned WPAR associated with a legacy OS version as that of the moving WPAR. If not, workload partition manager 330 may be used to create a private versioned WPAR associated with a legacy OS version as that of the moving WPAR (e.g., to be defined as the "parent" WPAR of the moving WPAR). As discussed above, alternatively, if a private versioned WPAR associated with a legacy OS version as that of the moving WPAR does not exist on the receiving host machine/system, the moving WPAR may be loaded and be defined as a "parent" WPAR for later-created versioned WPARS of the same legacy OS version. If at decisional block 608 a determination is made that the receiving host machine/system contains a private versioned WPAR associated with a legacy OS version as that of the moving WPAR, the method proceeds to block 612.

At block 612, the moving WPAR is loaded onto the receiving host machine/system. At block 614, configuration data of the private versioned WPAR designated as the parent WPAR for the moving/loaded WPAR is updated to identify the moving/loaded WPAR as a child or dependent WPAR of the private versioned WPAR. At block 616, configuration data of the moving/loaded WPAR is updated to identify the private versioned WPAR as the parent WPAR of the moving/loaded WPAR.

Thus, embodiments of the present disclosure enable a more efficient method of managing versioned workload partitions associated with legacy OS versions. For example, embodiments of the present disclosure enable disk space or memory savings by sharing resources of a parent WPAR to one or more child or dependent WPARs. Further, embodiments of the present disclosure enable efficient management of multiple versioned WPARs associated with a same legacy OS version by providing synchronization of software between a parent WPAR and its dependent or child WPARs. Thus, embodiments of the present disclosure provide a method for keeping all the WPARs associated with a particular legacy OS version running at the same level and/or configuration.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
a processor;
logic executable by the processor to:
create, in a host machine running an instance of a first version of an operating system, a first workload partition associated with a second version of the operating system, the second version of the operating system comprising a different version of the operating system than the first version of the operating system;
mount a first root file system and a user file system for the first workload partition, the first root file system comprising management information for managing the first workload partition;
create, in the host machine, a second workload partition associated with the second version of the operating system;
mount a second root file system for the second workload partition, the second root file system comprising management information for managing the second workload partition; and
hierarchically link the second workload partition to the first workload partition to enable sharing of resources of the first workload partition by the second workload partition, the second workload partition sharing the user file system from the first workload partition, and wherein the user file system of the first workload partition remains mounted while the second workload partition is active.

2. The system of claim 1, wherein the logic is executable to update a configuration attribute of the first workload partition identifying the second workload partition as a dependent workload partition of the first workload partition.

3. The system of claim 2, wherein the logic is executable to update a configuration attribute of the second workload partition identifying the second workload partition as a dependent workload partition of the first workload partition.

4. The system of claim 1, wherein the logic is executable to, responsive to a modification to the first root file system of the first workload partition, automatically apply the modification to the second root file system of the second workload partition.

5. The system of claim 1, wherein the logic is executable to:
place the first workload partition into an inactive state; and
maintain the user file system of the first workload partition in a mounted state while the first workload partition is in the inactive state to enable sharing of the user file system by the second workload partition.

6. The system of claim 1, wherein the logic is executable to, responsive to moving the second workload partition to another data processing system, update a configuration attribute of the first workload partition to remove the second workload partition as a dependent workload partition of the first workload partition.

7. A computer program product for shared workload partitions, the computer program product comprising:
a computer readable storage memory having computer readable program code embodied therewith, the computer readable program code comprising computer readable program code configured to:
create, in a host machine running an instance of a first version of an operating system, a first workload partition associated with a second version of the operating system, the second version of the operating system comprising a different version of the operating system than the first version of the operating system;
mount a first root file system and a user file system for the first workload partition, the first root file system comprising management information for managing the first workload partition;
create, in the host machine logical partition, a second workload partition associated with the second version of the operating system; and
mount a second root file system for the second workload partition, the second root file system comprising management information for managing the second workload partition; and
hierarchically link the second workload partition to the first workload partition to enable sharing of resources of the first workload partition by the second workload partition, the second workload partition sharing the user file system from the first workload partition, and wherein the user file system of the first workload partition remains mounted while the second workload partition is active.

8. The computer program product of claim 7, wherein the computer readable program code is configured to update a configuration attribute of the first workload partition identifying the second workload partition as a dependent workload partition of the first workload partition.

9. The computer program product of claim 7, wherein the computer readable program code is configured to, responsive to a modification to the first root file system of the first workload partition, automatically apply the modification to the second root file system of the second workload partition.

10. The computer program product of claim 7, wherein the computer readable program code is configured to:
place the first workload partition into an inactive state; and
maintain the user file system of the first workload partition in a mounted state while the first workload partition is in the inactive state to enable sharing of the user file system by the second workload partition.

11. The computer program product of claim 7, wherein the computer readable program code is configured to, responsive to a request to create the second workload partition:
determine an operating system version of the second workload partition;
determine whether there exists a workload partition having an operating system version corresponding to the operating system version of the second workload partition;
responsive to identifying a workload partition having an operating system version corresponding to the operating system version of the second workload partition, hierarchically linking the second workload partition to the identified workload partition.

* * * * *